Feb. 25, 1936.  E. C. CLAUS  2,032,049
ROCKING DEVICE
Filed Aug. 6, 1934  4 Sheets-Sheet 1
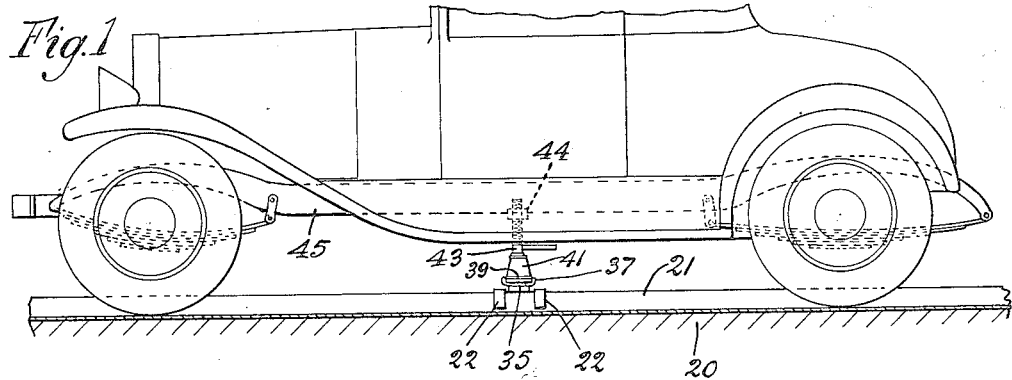
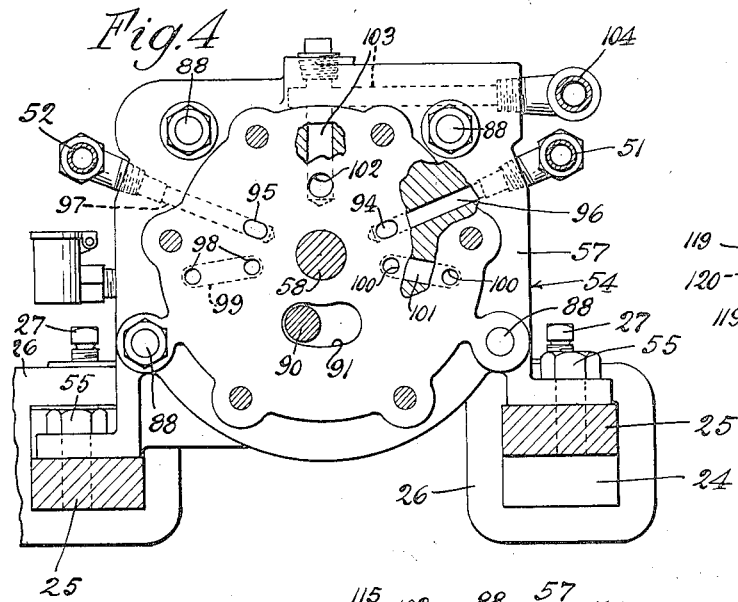
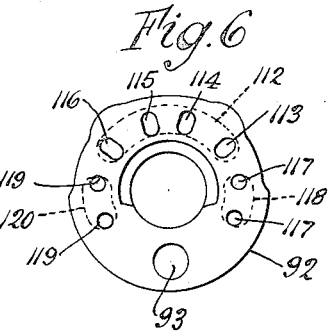
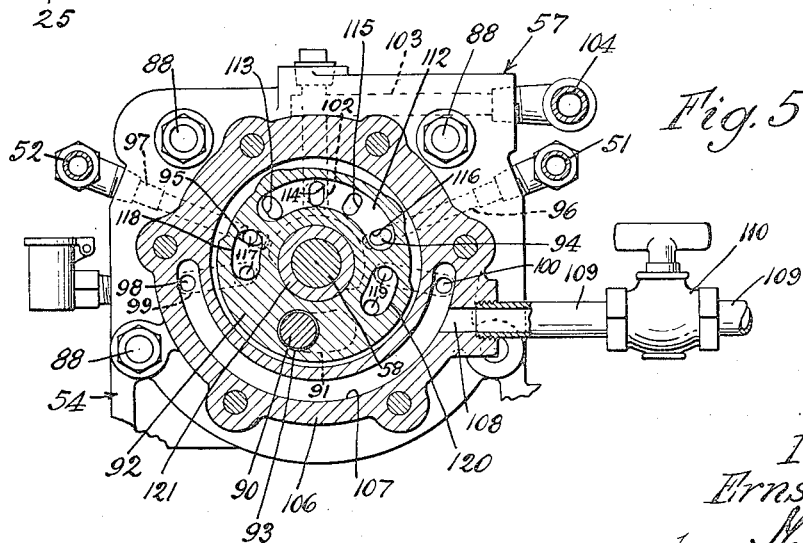
Inventor
Ernst C. Claus
by Henry Plech
Attorney.

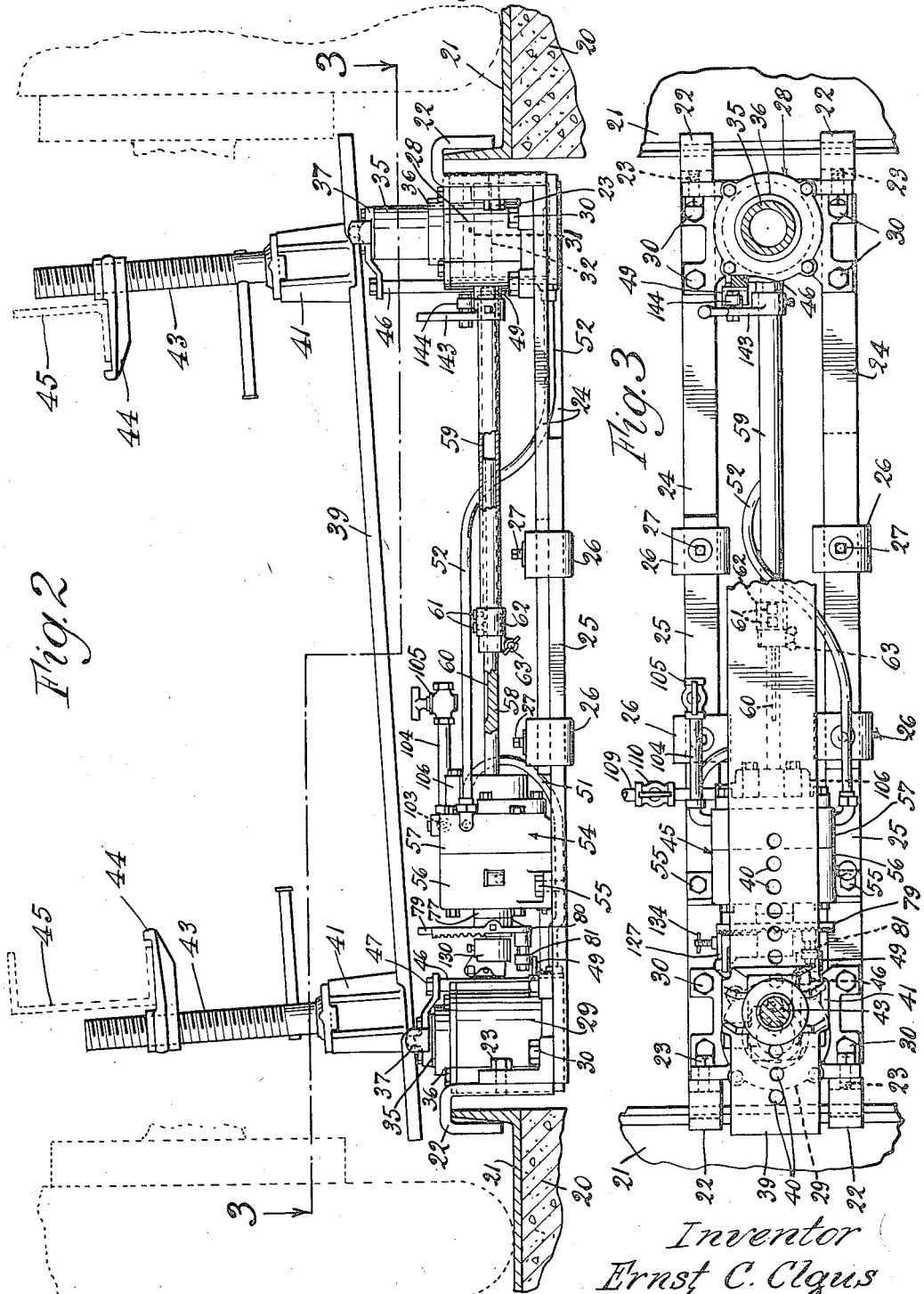

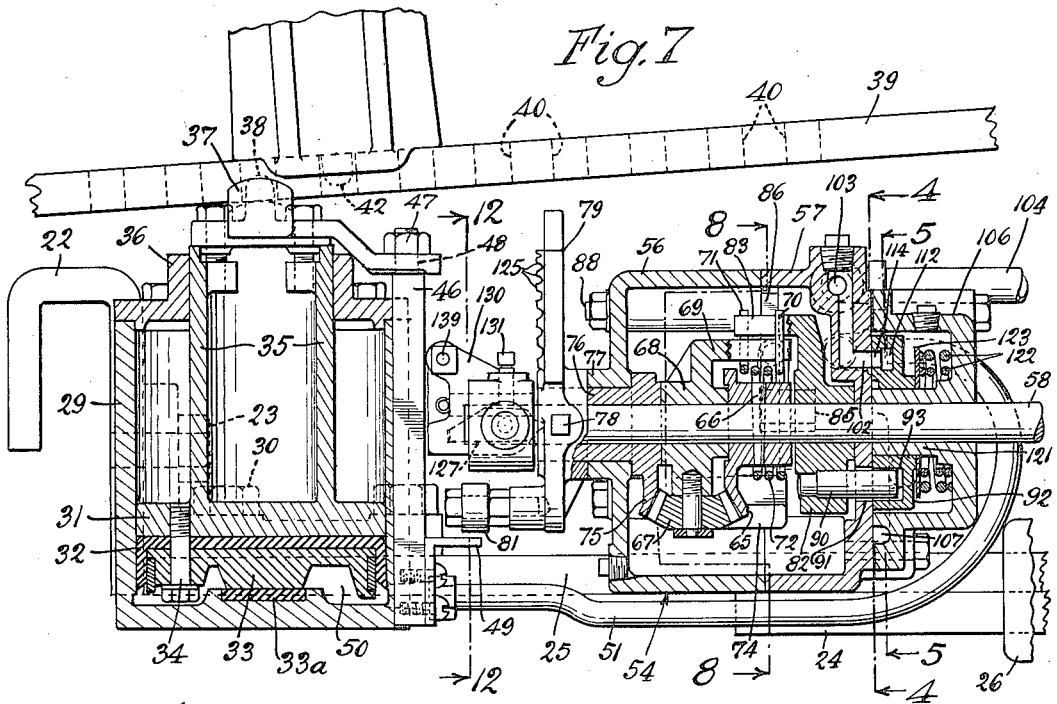
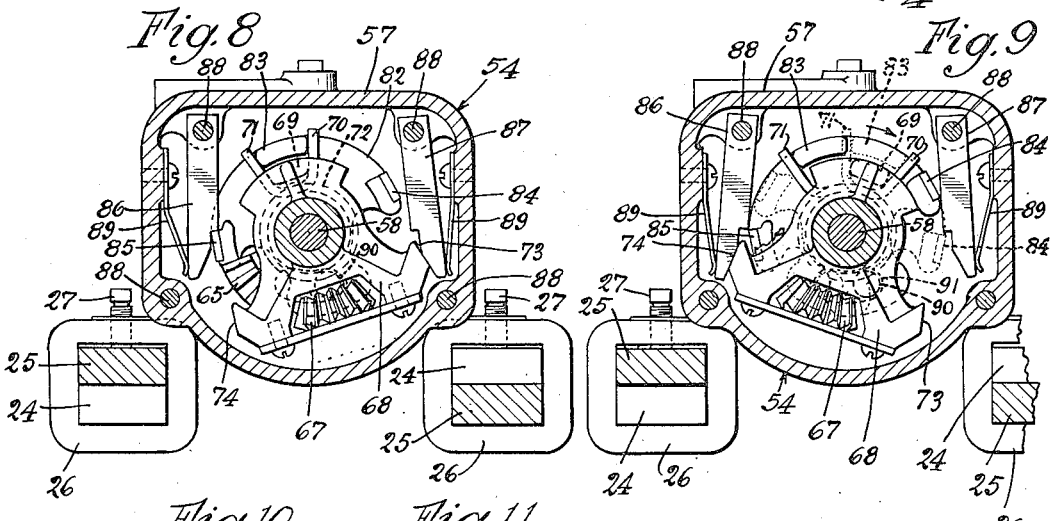
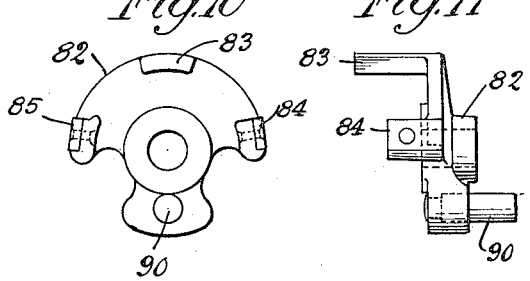

Feb. 25, 1936.    E. C. CLAUS    2,032,049
ROCKING DEVICE
Filed Aug. 6, 1934    4 Sheets-Sheet 4
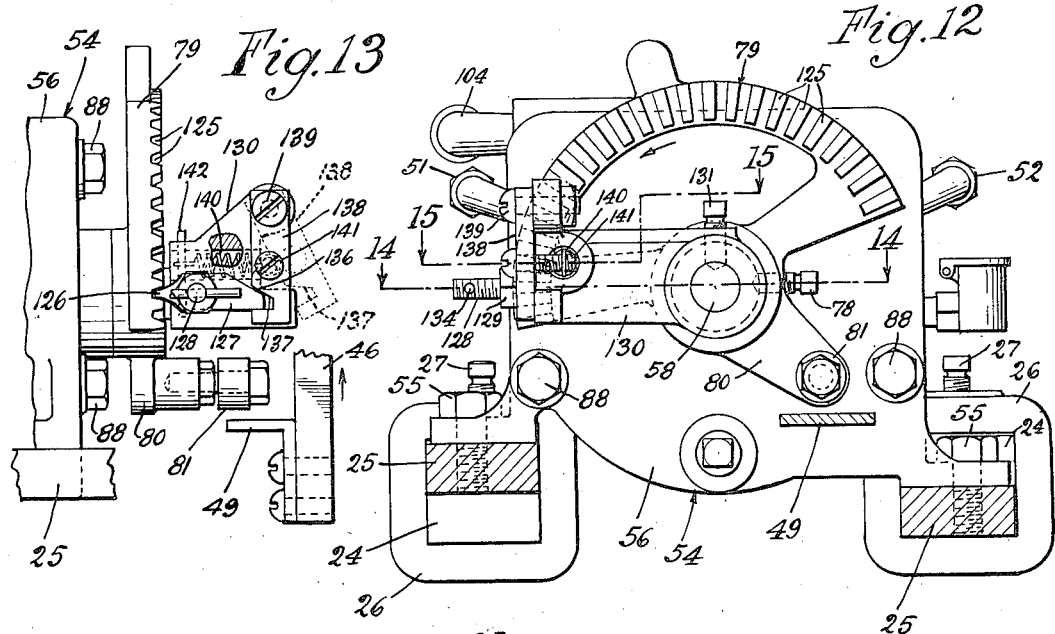
Inventor
Ernst C. Claus
by Henry Steel
Attorney.

Patented Feb. 25, 1936

2,032,049

UNITED STATES PATENT OFFICE 2,032,049

ROCKING DEVICE

Ernst C. Claus, Chicago, Ill.

Application August 6, 1934, Serial No. 738,615

7 Claims. (Cl. 73—51)

My invention relates to a rocking device for automobiles, vehicles and the like which may be mounted to span a pit or any suitable commercial hoisting device.

It is an object of the invention to support the weight of the chassis of a vehicle and alternately lift or rock either side for releasing the weight off the springs and to separate the spring leaves to enable the operator to inject oil or grease between said spring leaves and furthermore to locate loose connections or squeaks.

Another object of my invention is to provide in combination with the motors for obtaining a rocking or swaying motion, improved rotary valve means for alternately supplying fluid under pressure to said motors for raising associated pistons.

A further object of the invention is the effective quick acting valve mechanism for rotating the valve member proper for alternately directing fluid under pressure to the desired channels. It is also an object to equalize the pressure at either side of the rotary valve member to minimize the energy required for operation.

A still further object aims at providing safety releasing means to sever the driving connection between the valve operating shaft and the valve mechanism to prevent breakage.

Another object is the provision of means for adjusting the length of stroke of the pistons and thus changing the frequencies between successive strokes.

It is also an object to provide certain features of construction and arrangement tending to enhance the usefulness and efficiency of a machine of this character.

With these and other equally important objects in view which will become apparent from a perusal of the invention, the latter comprises the means described in the following specification, particularly pointed out in the claims forming a part thereof, and illustrated in the accompanying drawings, in which Fig. 1 is a side elevation of my invention as applied to an automobile. Fig. 2 is a front elevation. Fig. 3 is a horizontal section on the line 3—3 of Fig. 2. Fig. 4 is a section taken on the line 4—4 of Fig. 7. Fig. 5 is a view taken on the line 5—5 of Fig. 7. Fig. 6 is a front view of the valve disk. Fig. 7 is an enlarged partial vertical section. Fig. 8 is a section on the line 8—8 of Fig. 7. Fig. 9 is a view similar to Fig. 8 with the parts in different positions. Fig. 10 is a detail view of the valve operating member. Fig. 11 is a side elevation of the member shown in Fig. 10. Fig. 12 is an enlarged section on the line 12—12 of Fig. 7. Fig. 13 is a side elevation of the parts shown in Fig. 12. Fig. 14 is a section taken on the line 14—14 of Fig. 12. Fig. 15 is a fragmentary section on the line 15—15 of Fig. 12. Fig. 16 is a detail view. Fig. 17 is a side elevation of the part shown in Fig. 16.

Like parts are indicated by like symbols throughout the specification and drawings.

Referring to the drawings I have illustrated my device as being suspended and supported in a pit, the pit being shown at 20, having supporting channels 21. Suspended upon hook members 22 and secured thereon by bolts 23 are the motor housings 28 and 29 to which are secured by means of the screws 30 a plurality of supporting bars 24 and 25, respectively. The bars may be adjusted in relation to each other by means of the clamping sleeves 26 with their associated set screws 27 to accommodate different widths of pits, hoists and the like. In the motor housings 28, 29 reciprocate pistons 31, each having a leather cap 32 secured thereon by means of holding plates 33 and screws 34. The plate 33 is formed with a boss to engage a resilient washer 33a at its lowermost position. The piston 31 is herein shown as being integral with a piston sleeve 35 which projects through the housing cover 36. Mounted upon the sleeve 35 is a supporting member 37 having a pin 38. Supported upon the members 37 is a bar 39 provided with a plurality of apertures 40 to engage the pins 38. Supported upon the bar 39 are the jacks 41, provided with pins 42 also to be engaged by any one of the apertures 40. The jacks are provided with the screw threaded rotatable rods 43 upon which are screw threaded the supporting members 44 adapted to engage the channel members 45 of the chassis of a vehicle as illustrated in Fig. 1 and in dotted lines in Fig. 2. Each supporting member 37 is secured on a sliding bar 46 which may be secured by means of the lock-nut 47 upon the screw threaded end 48 of said bar. The housings 28 and 29 are grooved to receive the bars 46 which also carry angle members 49, the use of which will be later described.

Communicating with the lower part of the piston chamber 50 of the housing 29 is a flexible duct or pipe 51. Likewise the piston chamber in the housing 28 is connected to a flexible hose connection 52. Mounted upon the bars 25 adjacent the housing 29 is a valve housing generally indicated by 54. It may be secured thereon by means of the screws 55. The housing 54 is herein illustrated as being formed of two parts 56 and 57 (Figs. 2, 7). Supported in the housing is a shaft 58 and as illustrated in Fig. 2 it enters an extension sleeve 59 at one end. The shaft 58 is provided with a key-way 60 to receive locking members 61 in a clamp 62 which may be secured upon the sleeve 59. A lock screw 63 is adapted to clamp the shafts 58 and 59 together. The right end of the sleeve 59 as illustrated in Fig. 2 is supported in the housing 28. Referring to Figs. 7, 8 and 9 a segment gear 65 is mounted upon the shaft 58 within the housing 54. It may be secured by means of a pin 66. The gear segment 65 is in mesh with a pinion 67 supported upon a rocking member 68. The member 68 is positioned upon the shaft 58 and free to rotate thereon. It is provided with an extension finger 69 adapted to be engaged by the free ends 70 and 71 of a coiled spring 72. The spring is positioned about the hub of the segment gear 65. The member 68 is further provided with cam portions 73 and 74. A further segment gear 75 is threaded upon the shaft 58 and in mesh with the pinion 67 as illustrated in Fig. 7. The segment gear is provided with a hub 76 projecting through the bearing sleeve 77 of the housing portion 56. Mounted upon the hub 76 by means of a set screw 78 is a member 79 having an arm 80 adapted to support a roller 81 which is opposite to the angle member 49 of the lifting bar 46. Mounted upon the shaft 58 and free to rotate thereon is a member 82 illustrated in detail in Figs. 10 and 11. It is provided with a finger or lug 83 which is in engagement as illustrated in Figs. 7 to 9 with the free ends 70—71 of the coiled spring 72. The member 82 further carries projections 84 and 85 adapted to be engaged by dogs 86, 87 respectively, which are pivoted upon bolts 88 which also serve to secure the housing members 56 and 57 together. Spring members 89 normally hold the dogs in engagement with the lugs 84 and 85. The member 82 is further provided with a valve engaging pin 90.

Referring to Figs. 4 and 7 the housing 57 is slotted as at 91 through which extends a pin 90 to engage a corresponding recess 93 in a valve disk 92. The housing 57 is provided with apertures 94 and 95. The aperture 94 communicates by means of a duct 96 with the pipe 51 communicating with the piston chamber 50. The aperture 95 communicates by means of a duct 97 with the flexible hose connection 52 leading to the piston chamber of the housing 28. The housing 57 is further provided with apertures 98 which are connected by the cored out portion or chamber 99. The apertures 100 are similarly connected by the cored out portion or chamber 101. The aperture 102 communicates by means of ducts 103 with an exaust pipe 104 which is connected to a valve 105 as illustrated in Figs. 2 and 3.

Bolted to the housing 57 is a valve cap 106 having a cavity in which rotates the valve member 92 as illustrated in Figs. 5, 6 and 7. The valve cap 106 is formed with a segmental groove 107 which communicates by means of a duct 108 with an inlet pipe 109 controlled by means of a valve 110. As will be seen from Fig. 5 the groove 107 is in alignment with one of the apertures 98 and 100.

Referring to Figs. 6 and 7 the valve member 92 has a cored out duct 112 which communicates with a plurality of slots or apertures 113, 114, 115 and 116 respectively. The member 92 is further provided with apertures 117 connected by a cored out portion 118 and has also apertures 119 connected by a cored out portion 120. As will be seen from Figs. 6 and 7, the valve disk 92 is rotatably mounted upon the hub or sleeve 121 integral with the cap 106. The valve 92 is herein shown as being thrust against the face of the housing 57 by means of springs 122 bearing on a washer 123. The cap 106 is fitted with a plug for oiling the enclosed members. Referring to Figs. 7, 12, 13, 14, and 15. I have illustrated safety release means. The member 79 has a plurality of teeth 125 adapted to be engaged by a tooth 126 Fig. 13 formed on a release member 127, which is secured upon a bolt 128. Referring to Fig. 14 the release member 127 is screw threaded upon the bolt 128 and locked thereon by means of a nut 129. The bolt is supported in a member 130 which in turn is secured by means of a set screw 131 upon the end of the outward projecting shaft 58 as will be seen from Fig. 12. The bolt and release member 127 are normally thrust towards the right referring to Fig. 14 by means of a spring 132, one end of which bears against the end of a recess 133 of the member 130, the opposite end engaging the head of the bolt 128. Secured to the end of the bolt is a handle 134 to facilitate disengagement of the toothed end 126 of the member 127 with the teeth 125 of the member 79 as illustrated in dotted lines in Fig. 14. The release member 127 is also provided with an inclined surface 136 which enters an opposed slot 137 in a lever 138 pivoted as at 139. As illustrated in Figures 13 and 15 the lever 138 is normally thrust to the left as shown in Fig. 13 by means of a tension spring 140 engaging a screw 141 in the lever 138. The spring is positioned in a cavity in the member 130 and is anchored to a pin 142. Referring to Figs. 2 and 3 mounted upon the sleeve or extension shaft 59 adjacent to housing 28 is a lever 143 provided with a roller 144 in alignment with the angle member 49 upon the lifting bar 46. Said bar is shown as raised by the piston sleeve 35 and associated piston in the motor housing 28. The device operates as follows:

My invention is adapted to be used in connection with a pit or hoisting device for greasing and oiling the springs of vehicles and to locate loose connections and body squeaks. It enables the operators to efficiently grease the spring leaves, since by alternately lifting the weight of the vehicle off the springs, the leaves are somewhat separated. Figs. 1, 2 and 3 illustrate my rocking device installed to span a pit, hooks 22 or other suitable attaching members serving to suspend the device upon the track, herein shown as channel members 21. The supporting bars 24, 25 may be adjusted in relation to each other to compensate different widths of pits. The pistons 35 in the motor housings 28, 29 are raised alternately by means of air or liquid under pressure, thus raising the jacks, adjustably supported upon the cross bar 39 to compensate for different widths of chassis. The vehicle is preferably positioned upon the tracks 21 as illustrated in Fig. 1 so that the bracket members 44 underly the vehicle frame channels 45 intermediate the wheels.

Assuming that the pistons initially are in the down positions, the operator rotates the jack screws 43 by means of associated handles and raises the chassis sufficient to lift the bodily weight of the vehicle from the vehicle springs. The rocking motion, or alternately raising the jacks may now be started by opening the exhaust valve 105, likewise the intake valve 110 may be adjusted to control the flow of the fluid. Note that the weight of the vehicle lowers the piston when the pipe lines 51, 52 register with the exhaust ducts below described. The valve mechanism for delivering the fluid includes the telescoping shaft 58, 59 which is rocked by means of the lever 143 and member 79, both of which carry a roller 144 adapted to be engaged by the angular member 49 of the lifting bars 46, this vertical sliding motion being imparted by means of their associated pistons 31 and piston sleeves 35.

The rollers 81 and 144 with their respective levers are positioned upon the telescoping shaft to extend in opposite directions relative to the vertical plane intersecting the longitudinal axis of said shaft. The levers 143 and 80 are mounted at either end of the telescoping shaft 58 and 59 as illustrated in Figs. 2 and 3. The position of the rollers are such, that, if the roller 144 associated with the lever 143 is lifted by means of the angular member on the sliding bar 46 of the fluid motor 28 to its uppermost position, the roller on the arm 80, integral with the rocking member 79 is in its lowermost position.

It is important to vary the length of stroke of the pistons 31, which actuate the lifting jacks upon the horizontal crossbar 39, adapted to raise and lower either side of the chassis of vehicles alternately, since large vehicles require to be lifted higher than those of smaller vehicles to separate the individual leaves of their springs so as to permit injection of lubrication therebetween. Means for selectively changing the length of stroke, accomplished by varying the angle of separation of the levers 143 and 79, as illustrated in Fig. 7 and Figs. 12 to 15. In order to impart to the levers 143 and 80 a like degree of rotation either to increase or reduce the angle between them, a differential gear mechanism may be employed, which however, after desired adjustments of the actuating rock levers have been made, are held in locked relation to each other for rocking the telescoping shaft by means described below.

Referring to Figures 7 and 8, the segment gear 65 in the valve housing 54 is fast on the rock shaft 58, which by means of the pinion 67, carried by the member 68, imparts rotation to the segment gear 75 and thus to the rocking member 79. The rocking member is secured by means of the set screw 78 upon the hub portion, exterior of the housing 54, of the segment gear 75.

Secured to one end of the shaft, adjacent the rocking member 79 is the lever 130, which, by means of the release member 127, its tooth 126 engaging corresponding teeth 125 upon the rocking member 79, is held against rotation in relation to said rocking member. It will be realized if the members above described are in the full line position in which they are shown in Figs. 7, 13 and 14, that all are held in fixed relation to each other and rotate in unison with the shaft. However, if it is desired to change the stroke of the pistons 31 in the motor housings 28 and 29, the release member 127 may be pulled out of engagement with the rocking member 79 by its associated handle, as illustrated in dotted lines in Fig. 14 and thus becomes free for adjustment. The telescoping shaft 58, 59 which carries the lever 143 may now be rotated either clockwise or counter-clockwise by the lever 130 to the desired position, and the tooth 126 of the release member 127 may again be engaged and locked between adjacent teeth 125 of the rocking member 79. Assuming that the valve actuating member 68, which carries the pinion, is held in a fixed position, as will be later described, and the release member 127 out of engagement with the rocking segment 79, rotation of the segment gear 65, fast upon the telescoping shaft, in one direction imparts by means of the intervening pinion 67 a rotation in opposite direction to the segment gear 75 and its associated rocking lever 79.

Referring to Figs. 13 and 15, the release member 127 upon the pin 128 is normally held against rotation by engagement with the slot 137 in the arm 138. However, should one of the pistons 31 fail to descend and consequently hold either the rocking member 79 or the lever 143 in raised position, the driving connection between the rocking member 79 and the shaft 58, 59 may be severed by rotation of the release member 127 in counter-clockwise direction, referring to the parts as shown in Fig. 13. After a predetermined twisting strain the inclined face 136 of said release member 127 tends to rotate the lock arm 138 into the dotted line position and thus break the driving connection between the various parts.

Referring to the valve mechanism illustrated in Figs. 4 to 6 and assuming that the pistons of the motor 28, 29 are in the starting position that is to say both in their lowest positions and the valve member 92 aligned with its respective ports as shown in Fig. 5, fluid under pressure passes through the supply pipe 109, by opening the valve 110, and enters the arcuate slot 107, thence flows through the duct 99 by means of the holes 98 in the housing 57 and enters the cavity 118 in the valve disc 92 by means of one of the apertures 117. The other aperture 117 being in registry with the slot 95 communicating with the duct 97 in the housing 57, delivers the fluid to the flexible tubing 52 and thence to the piston chamber of the motor housing 28. Note that one of the apertures 119 in the valve disc 92 is opposed to the face of the valve housing and the flow of fluid, which may enter into the cavity 120 through the apertures 100 and channel 101 from the arcuate slot 107, is thus checked.

The pipe line 51 connected with the piston chamber of the motor housing 29 may exhaust its fluid, assuming that the piston in said housing is in the raised position, through the duct 96 and aperture 94 into the passage 112 of the valve disc through the aperture 116. The hole 114 in alignment with the aperture 102 in the valve housing 57 permits the fluid to escape through the duct 103, pipe line 104 and exhaust valve 105. The apertures 113 and 115 of the valve disc are opposed to the face of the housing 57 and thus rendered inoperative.

Figs. 7 to 11 illustrate the mechanism for imparting rotary motion to the valve disc 92 for reversing the cycle of delivery of fluid. Fig. 8 shows the parts in position at commencement, the valve operating member 82 being held locked by the dog 86 engaging the lug 85, and the finger piece 83 constraining the free end 71 of the spring 72. Meanwhile the shaft 58 and trip member 68 (see Figs. 16 and 17) rotate in the direction of the arrow in Fig. 9. The lug 69 integral with the trip member 68 and actuated by means of the shaft 58 rotates the free end 70 of the spring, compressing it, until the cam portion 74 of the trip member 68 moves the dog 86 out of engagement with the lug 85 as illustarted in Fig. 9 and permits the spring to rotate member 82, and by means of the pin 90 projecting through the slot 91 rotates the valve disc 92, which rotation is limited by said slot 91. The member 82 assumes the dotted position illustrated in Fig. 9 permitting the dog 87 to engage and hold the lug 84 since the cam member 73 cleared the path of movement of the dog 87.

The valve disc is now in position to exhaust the fluid in the motor housing 28 and to deliver fluid to the piston chamber 50 of the motor housing 29. The intake channel 107 by means of the holes 100 and duct 101 registering with one of the holes 119 of the cored out duct 120 of the valve disc, delivers fluid through the other hole 119, which now is in alignment with the slot 94 into the passage 96 and by means of the hose connection 51 into the motor housing 28. Likewise the slot 113 of the valve disc is now in registry with the aperture 95, communicating with the pipe line 52 which extends to the motor housing 29 and the slot 115 in alignment with the hole 102 exhaust the fluid through the exhaust pipe 104 governed by the valve 105. It will be realized that if the valve disc is in position above referred to, the fluid entering the intake channel 99 through one of the apertures 98 is rendered inoperative since one of the apertures 117 in the valve disc 92 is opposed to the face of the housing 57, with the other one in registry with one of the apertures 98 in said housing 57. In like manner, the slots 114 and 116 are now inoperative by being in opposition with the face of the housing 57.

Note that the valve cap 106 is provided with a gasket to insure a tight connection with the valve housing 57. When the fluid, such as compressed air is turned on, it will leak by the spring thrust valve disc 92 into the chamber housing the springs and equalize the pressure at both sides of the valve disc, thus facilitating ease of rotation for said disc, since only the friction of the thrust springs 122 are in effect.

While the drawings show a preferred embodiment of the invention, numerous changes and alterations may be made without departing from the purview of the invention. I, therefore, do not limit myself to details of construction and arrangement as shown, but claim my invention as broadly as the state of the art permits.

I claim:

1. In a machine as described, the combination with a lifting member, motors for alternately lifting and lowering opposite ends of said member, a shaft, levers mounted at either end of said shaft, for rotating the same when being rocked, sliding members on said motors for rocking said levers, a source of fluid under pressure, means adapted to provide communication between said fluid source and said motors, and valve mechanism actuated by said shaft for alternately opening and closing said communication.

2. In a machine as described, the combination with a lifting member, motors for alternately lifting and lowering opposite ends of said member, a valve shaft, means comprising sliding members on said motors for oscillating said valve shaft, a source of fluid under pressure, means adapted to provide communication between said fluid source and said motors, a valve mechanism actuated by said shaft for alternately opening and closing said communication, and control means on said shaft, cooperating with said sliding members for changing the frequencies of oscillations of said shaft.

3. In a machine as described, the combination with a lifting member, motors for operating said lifting member, a shaft, a pair of levers mounted on said shaft, one of said levers being adjustable about the axis of said shaft, sliding members operated by said motors for alternately lifting said levers for rocking said shaft, a source of fluid under pressure, means adapted to provide communication between said fluid source and said motors, and a valve mechanism, operable by said shaft for alternately opening and closing said communication whereby said motors are alternately actuated for raising and lowering opposite ends of said lifting member.

4. In a machine as described, the combination with a lifting member, motors for operating said lifting member, a shaft, a pair of levers mounted at either end of said shaft to extend in opposite direction in relation to the vertical plane of said shaft, said levers being operatively connected to said shaft to actuate the same, means cooperating with one of said levers for selectively increasing or decreasing the angle of setting of said lever, means comprising sliding members operated by said motors for alternately lifting said levers for rocking said shaft, a source of fluid under pressure, means adapted to provide communication between said fluid source and said motors, a valve mechanism, operable by said shaft for alternately opening and closing said communication whereby said motors are alternately actuated for raising and lowering opposite ends of said lifting member alternately.

5. In a machine as described, the combination with a lifting member, motors for operating said lifting member, a shaft, a lever fixed to one end of said shaft, an adjustable lever mounted on the opposite end of said shaft, locking means adapted to provide a driving connection between said adjustable lever and said shaft, sliding members operated by said motors for alternately actuating said levers for rocking said shaft, a source of fluid under pressure, means adapted to provide communication between said fluid source and said motors, a valve mechanism, operable by said shaft for alternately opening and closing said communication whereby said motors are alternately actuated for raising and lowering opposite ends of said lifting member alternately.

6. In a machine as described, the combination with a lifting member, motors for operating said lifting member, a shaft, a lever fixed to one end of said shaft, an adjustable lever mounted on the opposite end of said shaft, locking means adapted to provide a driving connection between said adjustable lever and said shaft, yielding means cooperating with said locking means for automatically severing said driving connection upon failure of said motors to operate, sliding members operated by said motors for alternately actuating said levers for rocking said shaft, a source of fluid under pressure, means adapted to provide communication between said fluid source and said motors, a valve mechanism, operable by said shaft for alternately opening and closing said communication whereby said motors are alternately actuated for raising and lowering opposite ends of said lifting member alternately.

7. A device for rocking vehicles comprising an adjustable support, a pair of fluid pressure motors on said support, a lifting member operated by said motors, a valve housing mounted on said support intermediate said motors, a shaft supported in said valve housing, levers on said shaft, sliding members operated by said motors for alternately actuating said levers, a source of fluid under pressure, means adapted to provide communication between said fluid source and said motors, a rotary valve in said valve housing, rocking means on said shaft cooperating with said rotary valve for alternately opening and closing said communication between said fluid source and said motors for alternately lifting opposite ends of said lifting member.

ERNST C. CLAUS.